United States Patent
Barlow

(10) Patent No.: US 12,523,600 B2
(45) Date of Patent: Jan. 13, 2026

(54) SENSING DEVICE AND RELATED METHODS

(71) Applicant: GeoPulse Solutions, Keene, NH (US)

(72) Inventor: Ryan Barlow, Keene, NH (US)

(73) Assignee: GeoPulse Solutions, Keene, NH (US)

( * ) Notice: Subject to any disclaimer, the term of this patent is extended or adjusted under 35 U.S.C. 154(b) by 80 days.

(21) Appl. No.: 18/412,215

(22) Filed: Jan. 12, 2024

(65) Prior Publication Data

US 2024/0241043 A1 Jul. 18, 2024

Related U.S. Application Data

(60) Provisional application No. 63/479,863, filed on Jan. 13, 2023.

(51) Int. Cl.
*G01N 21/35* (2014.01)

(52) U.S. Cl.
CPC ....... *G01N 21/35* (2013.01); *G01N 2201/021* (2013.01); *G01N 2201/062* (2013.01)

(58) Field of Classification Search
CPC ............ G01N 21/35; G01N 2201/021; G01N 2201/062
USPC ......................................................... 356/326
See application file for complete search history.

(56) References Cited

U.S. PATENT DOCUMENTS

| | | | |
|---|---|---|---|
| 7,709,794 B2 | 5/2010 | Zhao et al. | |
| 8,660,239 B2 | 2/2014 | Radley | |
| 10,656,011 B2 | 5/2020 | Marquardt et al. | |
| 11,278,220 B2 | 3/2022 | Tucker et al. | |
| 2004/0029213 A1 | 2/2004 | Callahan et al. | |
| 2004/0225222 A1 | 11/2004 | Zeng et al. | |

(Continued)

FOREIGN PATENT DOCUMENTS

| | | |
|---|---|---|
| CN | 114370938 A | 4/2022 |
| CN | 116046781 A | 5/2023 |

(Continued)

OTHER PUBLICATIONS

International Search Report and Written Opinion for International Application No. PCT/US24/11488 mailed May 17, 2024, 16 pages.

*Primary Examiner* — Md M Rahman
(74) *Attorney, Agent, or Firm* — Nutter McClennen & Fish LLP

(57) ABSTRACT

In some embodiments, a sensing device, and in particular, a modular spectral imaging device is described. The sensing device compiles one or more spectral images of an object in a point-by-point scan. The sensing device and related methods for scanning stationary objects provides spectral and spatial discrimination. Unlike conventional line scan or snapshot style devices, this system includes a sensor configured to function as a single pixel photodetector to sample a single point of a sample object. Spectral discrimination refers to isolating specific wavelengths of light within a spectral sensitivity range of a detector. Spatial discrimination refers to imaging an object within multidimensional space. The sensing device allows for configurability of both spectral bands and spatial resolution across a wide range of spectral sensitivities. Temporal scanning techniques are used to build up a multi-dimensional image. Modularity and automation are used to provide a broad range of capabilities.

23 Claims, 13 Drawing Sheets

(56) References Cited

U.S. PATENT DOCUMENTS

| | | |
|---|---|---|
| 2008/0001066 A1 | 1/2008 | Ax et al. |
| 2016/0054235 A1 | 2/2016 | Kim et al. |
| 2016/0320602 A1 | 11/2016 | Kazemzadeh et al. |
| 2019/0096083 A1* | 3/2019 | Arano .................. G06T 7/70 |
| 2020/0116558 A1 | 4/2020 | Pacala et al. |
| 2020/0200872 A1 | 6/2020 | Böckem et al. |
| 2021/0169581 A1* | 6/2021 | Calloway ............... A61B 34/20 |
| 2022/0054011 A1 | 2/2022 | Ragatz et al. |
| 2022/0201174 A1 | 6/2022 | Ma et al. |

FOREIGN PATENT DOCUMENTS

| | | |
|---|---|---|
| WO | 2012173285 A1 | 12/2012 |
| WO | 2022170168 A1 | 8/2022 |

* cited by examiner

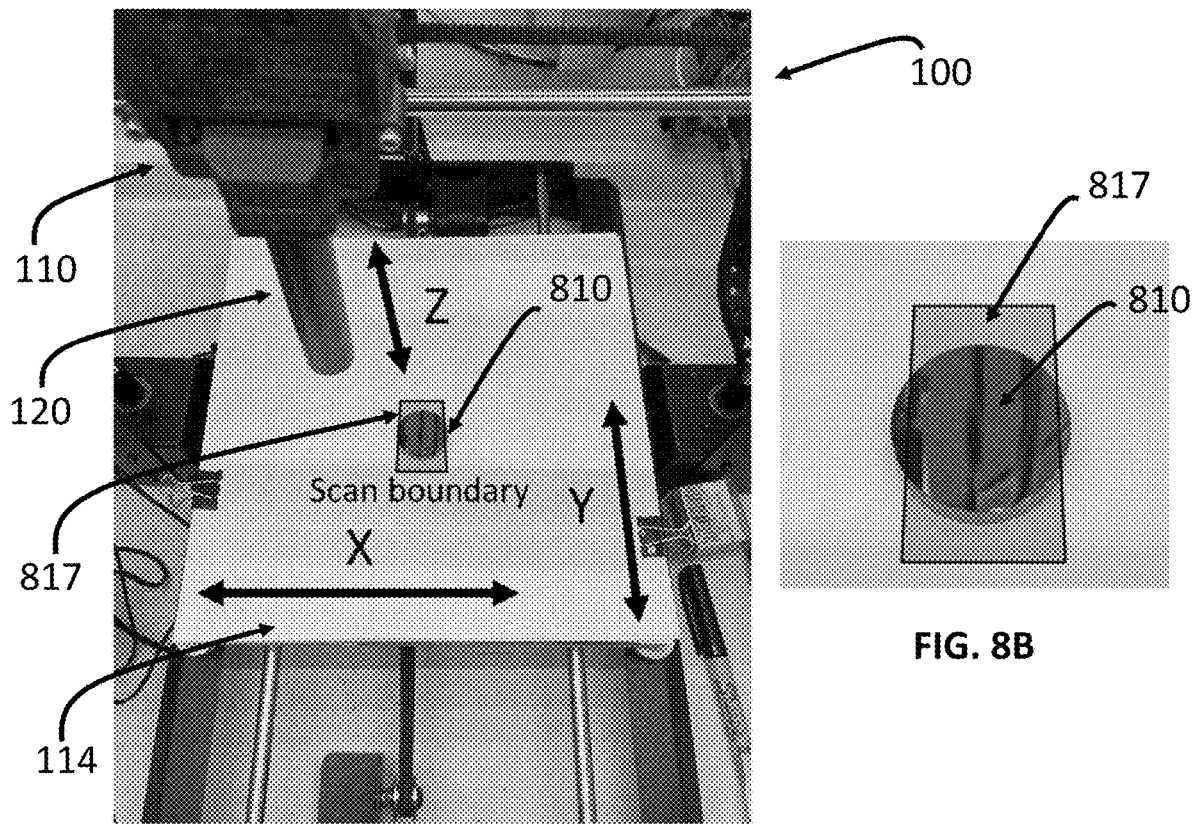
FIG. 8A
FIG. 8B
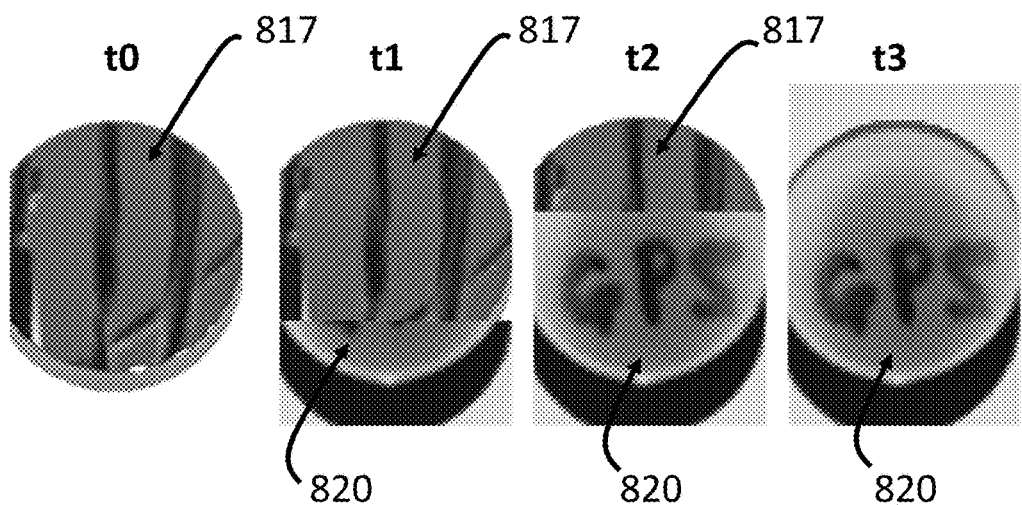
FIG. 8C

SENSING DEVICE AND RELATED METHODS

PRIORITY

This patent application claims priority from provisional U.S. patent application No. 63/479,863, filed Jan. 13, 2023, entitled, "SENSING DEVICE AND RELATED METHODS," and naming Ryan Barlow as inventor, the disclosure of which is incorporated herein, in its entirety, by reference.

FIELD

Illustrative embodiments of the invention generally relate to sensing device and related methods for scanning stationary objects and, more particularly, various embodiments of the invention relate to a sensing device that provides spectral and spatial discrimination.

BACKGROUND

Countless multispectral and hyperspectral imaging devices have been developed with an assortment of different design approaches. Similarly, single-point spectroscopy is a very mature field with instruments across industry and biosciences. While existing solutions have unique benefits and drawbacks, generally these devices are limited to a specific spectral sensitivity, spectral resolution, and spatial resolution.

Various sensing devices with optical sensing capabilities make use of cameras and optic assemblies which generally have the capabilities for sensing multiple wavelengths in a field of view. These cameras and optic assemblies can have high pixel resolution and are typically expensive, which make them unavailable for commercial or public use.

SUMMARY OF VARIOUS EMBODIMENTS

In accordance with one embodiment of the invention, a multispectral imaging device having an x-axis, y-axis, and z-axis for imaging an object includes a base and a movable carriage configured to be movable along the x-axis, y-axis, and z-axis. The z-axis is generally orthogonal to the base.

The multispectral imaging device also includes a single-pixel, photosensitive detector coupled with the movable carriage, and a sensor comprised of a lens and the photosensitive detector. The sensor is coupled with the movable carriage, and the sensor is configured to capture light in a visible or non-visible light frequency band at a single point on or within a sample when the base supports the sample.

The multispectral imaging device also includes a spectrally multiband or continuum illumination source.

The multispectral imaging device further includes a controller configured to automatically exchange spectral bandpass filters from the detector optical path to allow for spatial scans to be performed for more than one spectral band. The movable carriage, the base, or both the movable carriage and the base being automatically movable along the z-axis to produce a sensor focus adjustment relative to the object. A spatial scan may include a two-dimensional image compiled of point-by-point light signals captured in the visible or the non-visible light frequency bands.

The multispectral imaging device may further include a processor coupled to the sensor, the movable carriage, the base, and the controller. The processor may perform data fusion and analytics during spatial scans.

The multispectral imaging device may be further configured to take a first two-dimensional image at a first frequency band using a first filter to produce first results, take a second two-dimensional image at a second frequency band using a second filter to produce second results, perform data fusion and analytics on the first and second results. The multispectral imaging device may be further configured capture imagery with a focus topology adjustment.

The spectrally multiband or continuum illumination source may include a source of infrared, visible, and/or ultraviolet radiation in the wavelength range of between 150 nm and 30 microns. The source of infrared may include the short wave infrared region of 800 nm to 1700 nm. The source of visible and/or ultraviolet may include light emitting diodes (LEDs). The spectrally multiband or continuum illumination source may also include at least one of light from fluorescence or light from thermal infrared radiation. The spectrally multiband or continuum illumination source may include a quartz tungsten halogen (QTH) lamp.

The multispectral imaging device may be further include a robotic arm to automatically exchange spectral bandpass filters from the detector optical path, the robotic arm in electronic communication with the controller. The spectral bandpass filters may cover different wavelength bands ranges of wavelengths between 150 nm and 30 microns. The spectral bandpass filters may have a center wavelength that is between 1000 nm and 1700 nm, and may have a full width half maximum that is between 25 nm and 75 nm.

In accordance with another embodiment of the invention, a method of collecting a multispectral image of an object includes illuminating an object with a spectrally multiband or continuum illumination source, the object coupled to a base, and scanning the object with a sensor coupled to a movable carriage. The sensor includes a lens and a single-pixel photosensitive detector. The movable carriage is configured to be movable along the x-axis, y-axis, and z-axis. The z-axis is generally orthogonal to the base. The movable carriage is moved in a point-by-point raster pattern in an x-y plane defined by the x-axis and the y-axis. The method of collecting a multispectral image of an object includes capturing, during the scanning, a light signal from each point in the point-by-point raster pattern. The light signal from each point comprising one or more of a light reflected off of the object or a light signal emitted from the object. The light signal from each point passing through a spectral bandpass filter in the detector optical path. The bandpass filter is removably coupled to the sensor.

The method of collecting a multispectral image of an object further includes processing the light signal from each point in the point-by-point raster pattern in a processor, and generating a two-dimensional image compiled of the point-by-point single pixel light signals. The two dimensional image comprises an image layer in a wavelength band of the spectral bandpass filter. The illuminating, scanning, capturing, processing, and generating are controlled by a controller.

The scanning the object may be a first scanning. The capturing a light signal may be a first capturing through a first spectral bandpass filter. The processing may be a first processing. The generating may be a first generating. The image layer may be a first image layer.

The method of collecting a multispectral image of an object may further include scanning the object a second time with the sensor coupled to a movable carriage. The sensor may include a lens and a single-pixel photosensitive detector. The movable carriage may be configured to be movable along the x-axis, y-axis, and z-axis, with the z-axis being generally orthogonal to the base. The movable carriage may be moved in a point-by-point raster pattern in an x-y plane defined by the x-axis and the y-axis.

The method of collecting a multispectral image of an object may further include capturing, during the second scanning, a second light signal from each point in the point-by-point raster pattern. The second light signal from each point may include one or more of a second light reflected off of the object or a second light signal emitted from the object. The second light signal from each point may pass through a second spectral bandpass filter in the detector optical path, with the second bandpass filter having a different wavelength band than the first bandpass filter.

The method of collecting a multispectral image of an object may further include processing the second light signal from each point in the point-by-point raster pattern from the second scanning in a processor, and generating a second two-dimensional image compiled of the second point-by-point single pixel light signals. The second two dimensional image may include a second image layer in a second wavelength band of the second spectral bandpass filter.

The method of collecting a multispectral image of an object may further include combining the second image layer with the first image layer to form a multispectral image of the object. The movable carriage may be a gantry.

The method of collecting a multispectral image of an object may further include exchanging the first bandpass filter with the second bandpass filter. The exchanging may be performed automatically with the movable carriage. The automatic exchanging may controlled by the controller.

In accordance with another embodiment of the invention, a multispectral imaging system for imaging an object includes a base, and a movable carriage configured to be movable along an x-axis, a y-axis, and a z-axis. The z-axis is generally orthogonal to the base.

The multispectral imaging system for imaging an object also includes a sensor module comprising a lens and a single-pixel photosensitive detector. The sensor module is coupled with the moveable carriage. The sensor module is configured to capture a light signal in one or both of a visible light frequency band or a non-visible light frequency band.

The multispectral imaging system for imaging an object also includes an illumination module. The illumination module includes one or more illumination sources.

The multispectral imaging system for imaging an object also includes a microscope module. The microscope module includes a lens and a digital camera.

The multispectral imaging system for imaging an object also includes a controller configured to allow for spatial scans to be performed for more than one spectral band. The movable carriage, the base, or both the movable carriage and base are automatically movable along the z-axis to produce a sensor focus adjustment relative to the object.

The one or more illumination sources may include one of more narrow band light sources. The one or more narrow light sources may be automatically exchangeable. The one or more narrow band light sources may include an LED or a laser. The LED or the laser may have wavelength bands between 1 nm and 300 nm.

The single-pixel photosensitive detector may include a multi-head detector or a single-head detector.

The multispectral imaging system for imaging an object may further include a robotic arm to automatically exchange spectral bandpass filters from the detector optical path. The robotic arm may be in electronic communication with the controller. The robotic arm may further exchange lenses on the microscope module.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 8A shows a photograph of an embodiment of the sensing device in accordance with the present disclosure.

FIG. 8B shows a photograph of an embodiment of an object device in accordance with the present disclosure.

FIG. 8C illustrates successive steps of an embodiment in creating a single layer spatial scan made up of a two dimensional image in accordance with the present disclosure.

DESCRIPTION OF ILLUSTRATIVE EMBODIMENTS

Figure 1:
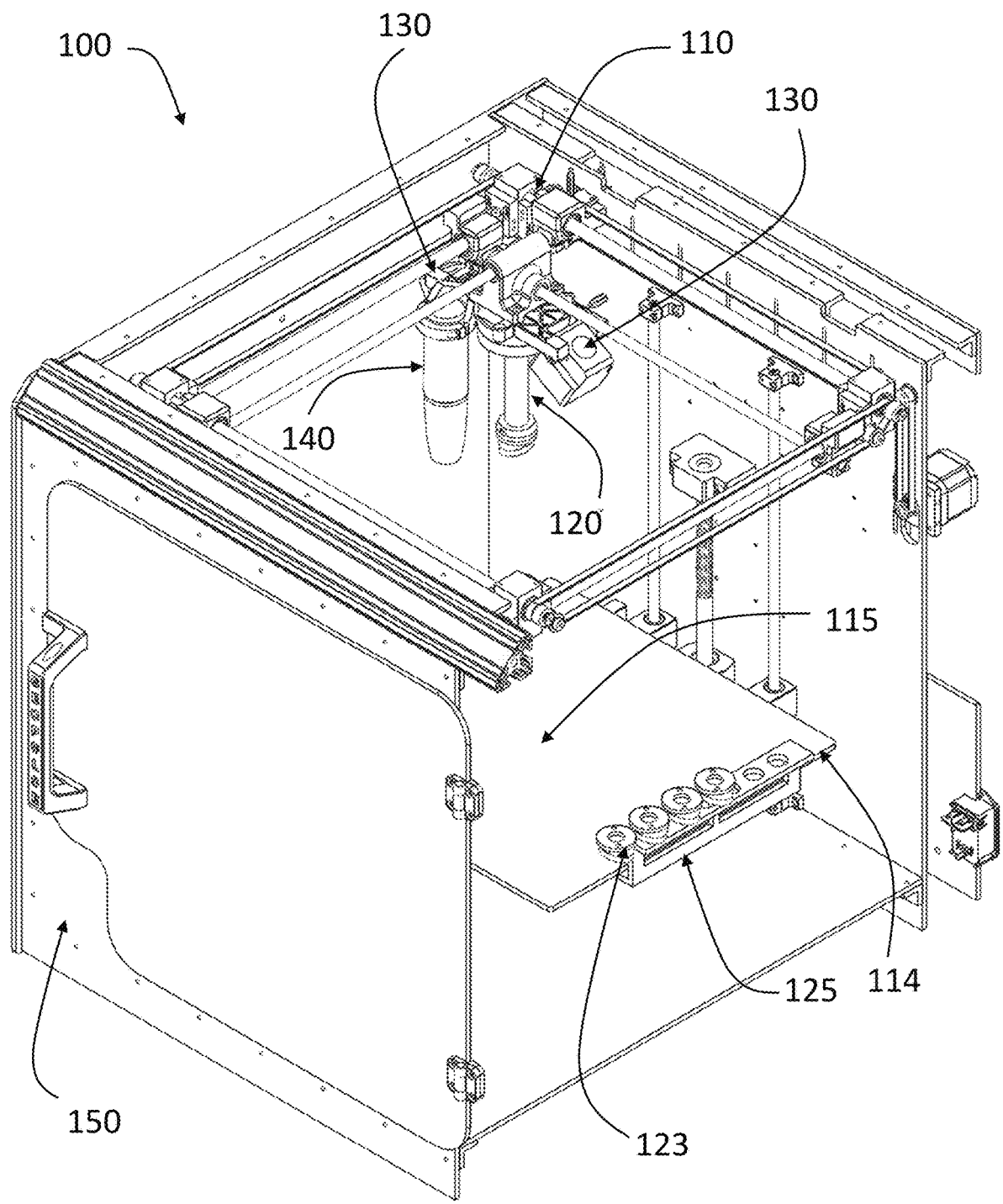
FIG. 1 illustrates a wiredrawing of one embodiment of a sensing device in accordance with the present disclosure.

In illustrative embodiments, a sensing device compiles one or more spectral images of an object collected by a sensor in a point-by-point scan. The sensor has a single-pixel, photosensitive detector coupled to a movable carriage that is moved in an x-y plane of a sample stage, and in a z-axis that is generally perpendicular to the surface of the sample stage. The sensor scans the object pixel-by-pixel to record a two-dimensional spectral image by being moved in a raster pattern in the x-y plane, and the sensor (e.g., photosensitive detector) is focused by being automatically moved in the z-direction to a focus height. The pixel The sensing device and related methods for scanning stationary objects provides spectral and spatial discrimination. The spectral resolution is provided by passing light reflected and/or emitted off of the object through a bandpass filter, and the spatial resolution is provided by compiling the single-pixel images into a spectral image. Multispectral images are generated by combining more than one two-dimensional spectral images by signal processing. Unlike conventional line scans or snapshot style devices, the disclosed system includes a sensor configured to function as a single pixel photodetector to sample a single point of a sample object.

Details of illustrative embodiments are discussed below.

Spectral and Spatial Discrimination

Spectral discrimination refers to isolating specific wavelengths of light within a spectral sensitivity range of a detector. By isolating different wavelengths of light, it is possible to discriminate between two different substances and/or compounds, since each substance typically has a characteristic wavelength response to illumination by a broadband light (e.g., radiation source). That is, each substance has something like a spectral finger print that can give a stronger optical signal response in one wavelength band compared to another wavelength band.

An example of spectral discrimination can be shown by detecting the presence of a small amount of water in a fabric or on a surface. The porous fabric or surface may look or feel dry upon inspection. However, by shining a broadband light source on the fabric or surface, and then detecting the reflected light in a wavelength band that is sensitive to water, it is possible to determine if there is actually water present.

Spatial discrimination refers to imaging an object within multidimensional space. Spatial discrimination becomes increasingly important as it becomes necessary to determine the extent of the coverage or presence of a compound or material in a certain location. Spatial discrimination is also important in situations when the proximity of two different substances becomes very close, and it is necessary to resolve the locations of each substance. In some cases, it is not possible to visibly identify the presence of two different substances, or to tell their relative locations. However, by scanning an object with very small steps between observations (e.g., measurements), it is possible to resolve the locations of compounds or materials that are in close proximity.

In some embodiments, the sensing device described herein provides the ability to determine both the presence or absence of certain substances and/or compounds, as well as determine the relative location of those substances and/or compounds and their proximity to each other on an object. As in the example above, detecting the presence of a small amount of water in a fabric or on a surface may be determined with a high degree of reliability with the sensing device. In addition, the specific location(s) of the water can be determined.

In some embodiments, the sensing device described herein allows for configurability of both spectral bands and spatial resolution across a wide range of spectral sensitivities. The spectral sensitivities may be configured to not only determine the presence of certain chemicals, but also to measure the amounts of chemicals present. For example, the ability to determine a material's purity in a quality control (QC) function may be crucial to a manufacturer.

Configuring the spectral bands of measurements may be accomplished by using different band pass spectral filters. In some situations, it is important to determine the presence or absence of compounds that are detectable in the infrared (e.g., IR) region of the spectrum. In illustrative embodiments, the sensing device described herein may be used to detect IR light (e.g., radiation) signals reflected by or emitted from compounds in or on an object under examination.

A combination of spectral filtering techniques, including emission sources and transmissive bandpass filters, can provide customizable spectral sampling combinations for measurement and discrimination. Automated switching between filters and sources provides for multidimensional spectral imaging, where each layer constitutes a unique and configurable spectral band. These images can be calibrated and co-registered through data processing, including data fusion and analytics.

The combination of multiple spectral images can be achieved with a computer based signal processor. Analog sensor heads with unique detector sensitivities can be swapped in a modular fashion. Each sensor module has an onboard microcontroller associated with each sensor, capable of non-volatile memory containing calibration information. Connection to the sensor module will provide device power, communications, and data input/output.

One or more embodiments of the present disclosure may include an automated exchange mechanism to swap spectral bandpass filters from the end of the lens tube on the sensor module. In some embodiments, the movable carriage moves the sensor assembly to the filter holder to place the spectral bandpass filter already mounted on the lens tube into the filter holder. Then, the movable carriage moves the sensor assembly to the next spectral bandpass filter that is identified to be used in the next scan.

In some embodiments, the spectral bandpass filter may be mounted to the lens tube magnetically. The spectral bandpass filter may be removed from the lens tube by leveraging the band pass filter off of the lens tube against the filter holder.

Point-to-Point Scanning

In some embodiments, the sensing device described herein includes a movable carriage that is configured to be movable along an x-axis, a y-axis, and a z-axis in increments that can be adjusted by the user to optimize the spatial resolution of the multispectral imaging of a given object. In some embodiments, the movable carriage moves the sensor in a raster pattern in the x-y plane and automatically adjusts the height of the sensor in the z direction to focus the sensor on a single point image. The z-axis being generally orthogonal to the base.

A micro-controller unit on the sensing device synchronizes the scanning movable carriage and sensor data collection, ultimately either saving the data on board or relaying the data to an external computer for real-time analysis and processing. A variety of scan configurations may be used consistent with the present disclosure. The scan configurations can operate on an x-y plane when imaging flat objects.

In some embodiments, when an object to be scanned has a three-dimensional geometry that exceeds the optical depth of focus, the z axis can be used to adjust for best imaging performance. By adjusting the z-direction coordinates to a predetermined vertical profile, a "focus topology" map adjustment can be made. A focus topology map can be generated where every x, y point on the scan has a z value corresponding to the focus map. This provides a "focus topology" adjustment in this system. The ability to scan an object in a vertical profile, in addition to the x-y plane, utilizing a "focus topology" map is a surprising capability of presently disclosed system. This is differentiating capability compared to conventional imaging devices, such as cameras, because cameras are inherently planar with a single plane of focus.

Multispectral Imaging

In some embodiments, the sensing device may produce a first two-dimensional image of an object in a first spectral band. A light source may illuminate the object. The light source may be a spectrally multiband or continuum illumination source, which may include a source of infrared, visible, and ultraviolet radiation in the wavelength range of between 150 nm and 30 microns. The movable carriage moves the sensor in an x-y raster pattern, and at each point in the x-y plane a single-pixel image of light reflected and/or emitted light from the object is passed through a first spectral bandpass filter and collected by the sensor. The reflected and/or emitted light that is collected by the sensor is received by a processor which performs data fusion and analytics during the scans. The processor generates a first two-dimensional spectral image of the object which is a first spectral layer. The scans may be referred to as spatial scans and/or spectral scans.

In some embodiments, the sensing device may be configured to produce multispectral images by layering at least two, two-dimensional spectral images. The combination of two, two-dimensional spectral images are used to build up a multi-dimensional image. Modularity and automation are used to provide a broad range of capabilities.

A combination of spectral filtering techniques, including emission sources and transmissive bandpass filters, can provide customizable spectral sampling combinations for measurement and discrimination. Automated switching between filters and sources provides multidimensional spectral imaging, where each layer constitutes a unique and configurable spectral band. These images can be calibrated and co-registered through data processing.

The combination of multiple spectral images can be achieved with a computer based signal processor. Analog sensor heads with unique detector sensitivities can be swapped in a modular fashion. Each sensor module has an onboard microcontroller associated with each sensor, capable of non-volatile memory containing calibration information.

Connection to the sensor module will provide device power, communications, and data input/output. A microcontroller unit on the device synchronizes the scanning movable carriage (e.g., gantry) and sensor data collection, ultimately either saving the data on board or relaying the data to an external computer for real-time analysis and processing.

When the multispectral imaging is performed in non-visible wavelength bands, then, in embodiments, the image layers may be represented by visible colors. For example, it may desirable to operate the sensing device in the short wavelength infra-red (SWIR). Three spectral bandpass filters may be selected to cover non-overlapping wavelength band regions in the SWIR. Once the three two-dimensional scans are collected and processed, the bands may be assigned visible colors, such as red, green, or blue. The spectral scans that have been assigned the visible colors may be combined to form a multispectral image that is visible due to being converted to visible colors.

FIG. 1 illustrates a wiredrawing of one embodiment of a sensing device 100 in accordance with the present disclosure. The sensing device includes a movable carriage 110 that can be moved in three dimensions, along an x-axis, a y-axis, and a z-axis. The movable carriage 110 may be moved in an x-y plane, as well as in a z-axis perpendicular to the x-y plane. The sensing device 100 may be mounted in an enclosure 150.

The sensing device 100 may have a sensor module 120 mounted to the movable carriage 110. The sensor module 120 can be positioned in the x-y plane, as well as translated along the z-axis by the movable carriage 110.

The movable carriage 110 is configured to move the sensor module 120 during sample detection. The movable carriage 110 may contain stepper motors, drive belts, linear rods, limit switches, bearings, a sensor carriage bracket, and a mechanical housing. The movable carriage 110 bracket is attached to linear rods (or referred to herein as movable carriage elements or X, Z elements) with bearings to constrain motion and encourage low friction translation, while drivebelts attached to stepper motors are coupled to the carriage to provide movement in x-axis and z-axis. The y motion is done via a Y-element and may contain similar components to the x and z motion described above. The movements of the movable carriage 110 may be accomplished with one or more stepper motors. The stepper motor may predetermined to have a step size of 100 microns or less. The step size may be 100 microns, or may be between 100 microns and 500 microns, or be between 400 microns and 800 microns, or between 500 microns and 1000 microns (e.g., 1 mm), or between 1 mm and 5 mm, or between 5 mm and 10 mm, or the like.

In some embodiments, y motion may be isolated to base 114. When the sensor module 120 is mounted to the movable carriage 110 bracket, motion can be executed along all three axes as necessary. While in some embodiments, the y motion is separate from the base 114, and x and z motion to the sensor module 120, other embodiments may utilize a remote sensing technique, and consequently other types of mechanics. Likewise, motion does not necessarily need to be driven in linear coordinates, as non-linear movable carriage 110 functionalities can be utilized. The movable carriage 110 contains an electrical interface for communications, data transfer, and power (not shown). The movement along more than one axis over a duration of time could give the sensor module 120 a non-linear movement.

The sensing device 100 includes a base 114 that in some embodiments can be adjusted in the z-direction. The surface of the base 114 may have a sample stage 115 mounted upon it. The base 114 and the sample stage 115 may form the surface of the x-y plane. In this embodiment, that sample stage 115 may be adjusted up and down in the z-direction perpendicular to the x-y plane of the sample stage 115. The sample stage 115 is located beneath the sensor module 120 and has retaining mechanics and mounting features for different types of samples. Additionally, the sample stage 115 can include a heated function to provide thermal contrast in the mid-wave infrared (MWIR) and long-wave infrared (LWIR). The LWIR sources may include a nichrome wire lamp. In-scene calibration references of a known reflectance, transmission, and emissivity can be included on the sample stage to calibrate sensor data in situ.

In a further embodiment of the present disclosure, the sample stage 115 can be configured to provide heat for calibration and thermal contrast and/or thermal contrast. The heated sample stage 115 can be used to provide calibration by means of temperature/emissivity separation with a known emissivity target coupled to the stage. Thermal contrast is provided via conduction to the object to increase radiative photonic signal in the thermal infrared The sensing device 100 may have one or more illumination modules 130. An illumination module 130 includes an illumination source, which may be a spectrally multiband source or continuum source. The spectrally multiband or continuum illumination sources may provide a source of infrared, visible, or ultraviolet radiation in the wavelength range of between 150 nm and 30 microns. In embodiments, the illumination source may be a quartz tungsten halogen (QTH) lamp.

The illumination module 130 provides a variety of types of illumination. For example the illumination module 130 may be a broadband halogen illumination to provide high signal across the Short-Wave Infrared (SWIR) portion of the spectrum. The intensity and color temperature of these bulbs can be adjusted to change the illumination peak and may also be used with MWIR and LWIR sensor head types. Color temperature adjustment may be manual or automatic, as needed. The boresight of the bulbs can be mechanically adjusted to center on the sensor module Field of Regard (FOR). Another type of illumination module 130 is an LED (e.g., light emitting diode) illuminator that is removable. A mechanical boresight adjustment may also operated with a thumb screw for simultaneous adjustment of all LED pointing. LED intensity can be adjusted through a digital potentiometer. Automated electronic interfacing can control various illumination channels on and off as directed by the software routine.

The sensing device 100 may include a digital camera microscope 140. The digital camera microscope 140 may include an interchangeable lens that may include magnifications between about 1× power and 10,000× power. The resolution of the microscope may have a resolution of up to 0.3 mm, and a range of resolution values between 100 mm and 0.3 mm. The microscope 140 may include a CCD (charge coupled device) image sensor that records images of the object.

Figure 2:
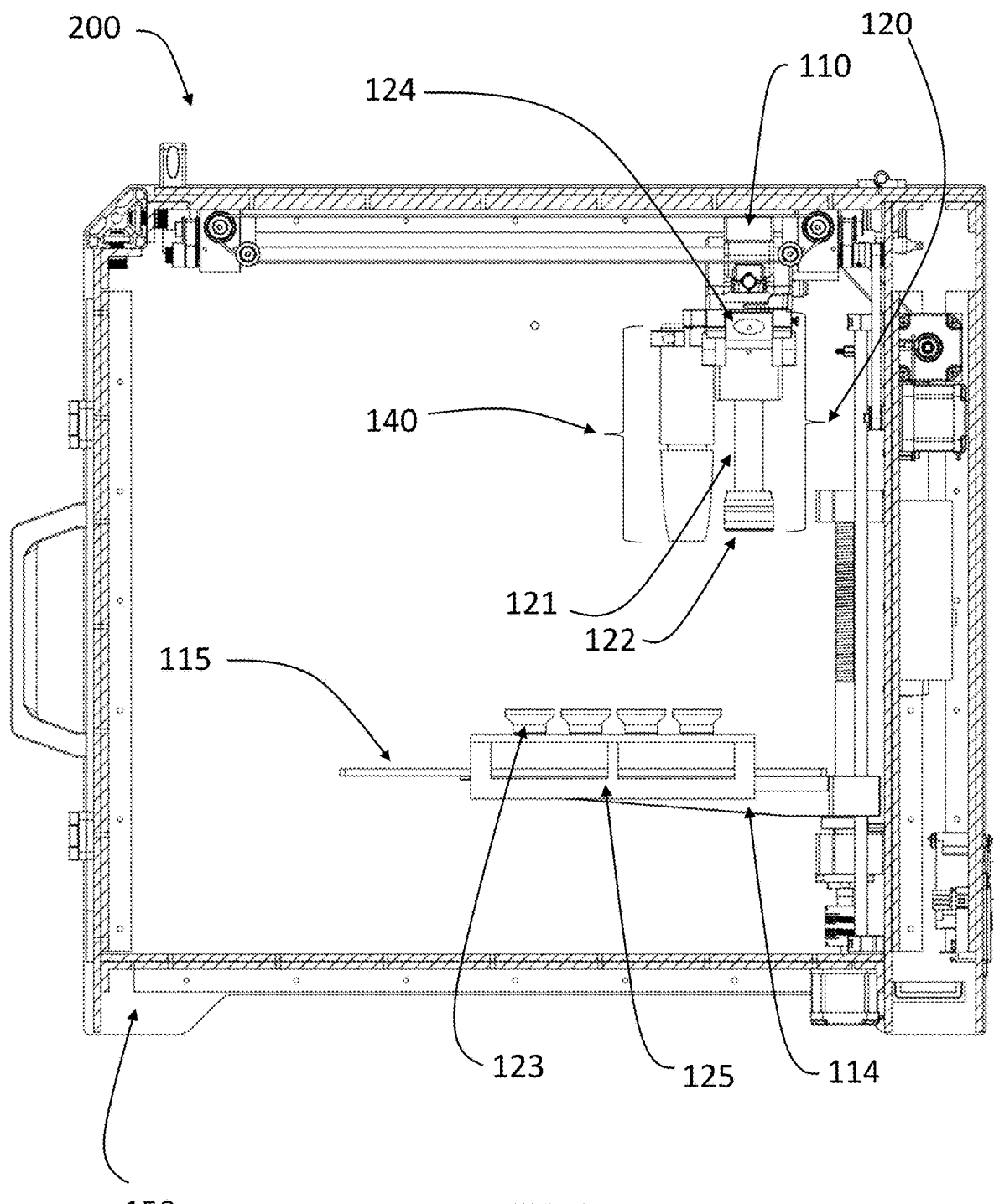
FIG. 2 illustrates a wiredrawing of a cross section of one embodiment of a sensing device in accordance with the present disclosure.

FIG. 2 illustrates a wiredrawing of a cross section 200 of one embodiment of the sensing device 100 in accordance with the present disclosure. The movable carriage 110 is shown with the sensor module 120 and the digital camera microscope 140 mounted to it. The stage 115 is shown mounted to the base 114. One or more additional bandpass filters 123 can be positioned in a filter holder 125.

The sensor module 120 includes a sensor 124, a lens tube 121, and a spectral bandpass filter 122. The movable carriage 110 translates the sensor module 120 in the x-y plane in a raster pattern in a point-by-point scan, and also moves the sensor module 120 up and down in the z-direction automatically to focus the sensor 124 at each point. The focus controls are provided automatically by a controller (not shown). The sensor module 130 contains electronics for signal conditioning and filtering, including an analog-to-digital converter (ADC) when working with analog sensors. Some analog sensors have self-contained ADC and may not require an additional ADC. The sensor module 130 or a modular sensing carriage (not shown) contains general electronics that are repurposed for all analog sensor head combinations. These electronics include power regulators and a micro-controller unit (MCU) (not shown).

Figure 3:
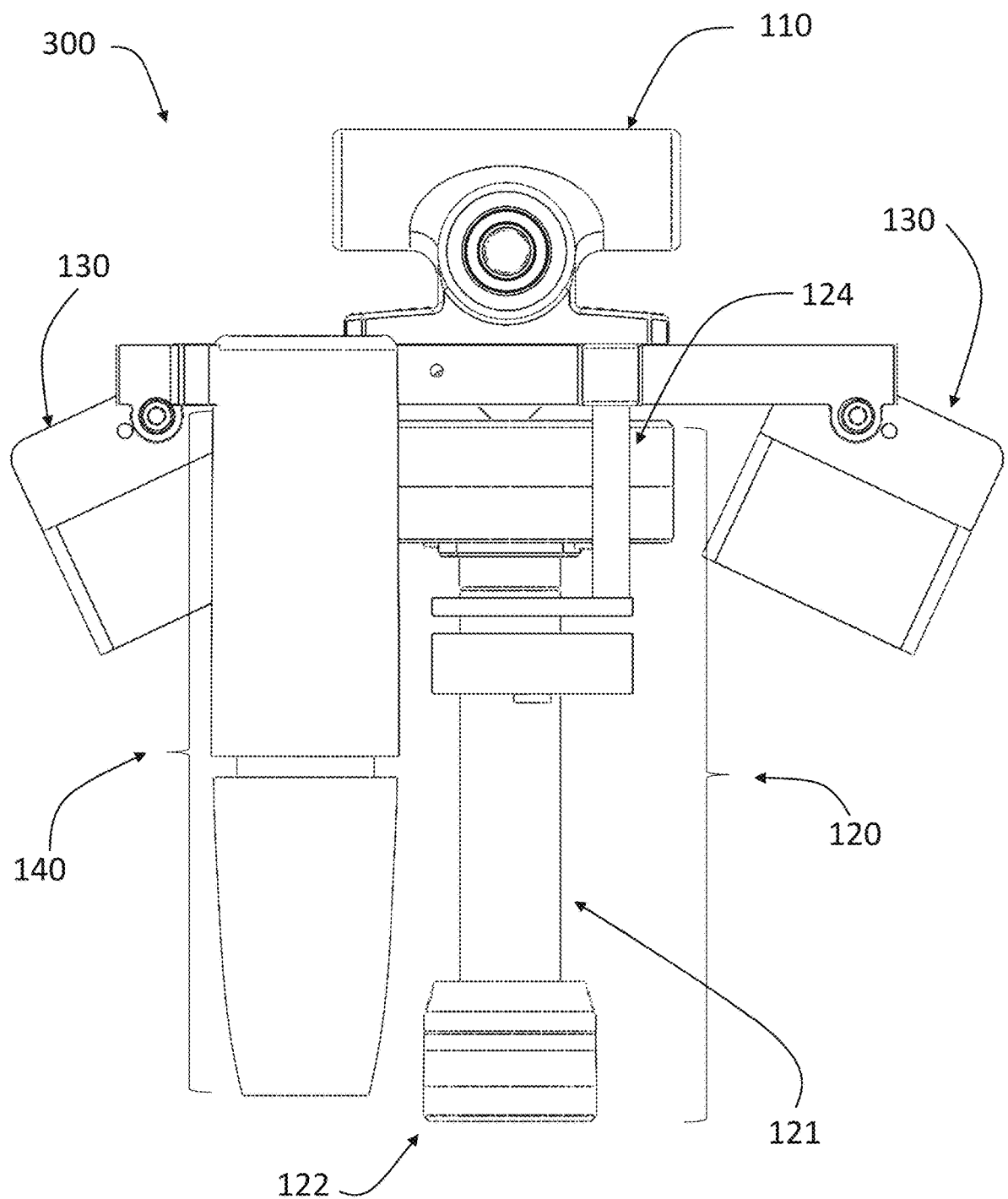
FIG. 3 illustrates a wiredrawing of a portion of one embodiment of a sensing device in accordance with the present disclosure.

FIG. 3 illustrates a wiredrawing of a portion 300 of one embodiment of a sensing device 100 in accordance with the present disclosure. The manner in which the sensor module 120, the illumination modules 130, and the digital camera microscope 140 are coupled to the movable carriage 110 for one embodiment of the present disclosure is shown in FIG. 3. The illumination modules 130 are shown directed to a focal point below the sensor module 120. The sensor module 120 is shown with the sensor 124, the lens tube 121, and the bandpass filter 122. The digital camera microscope 140 is shown.

Figure 4:
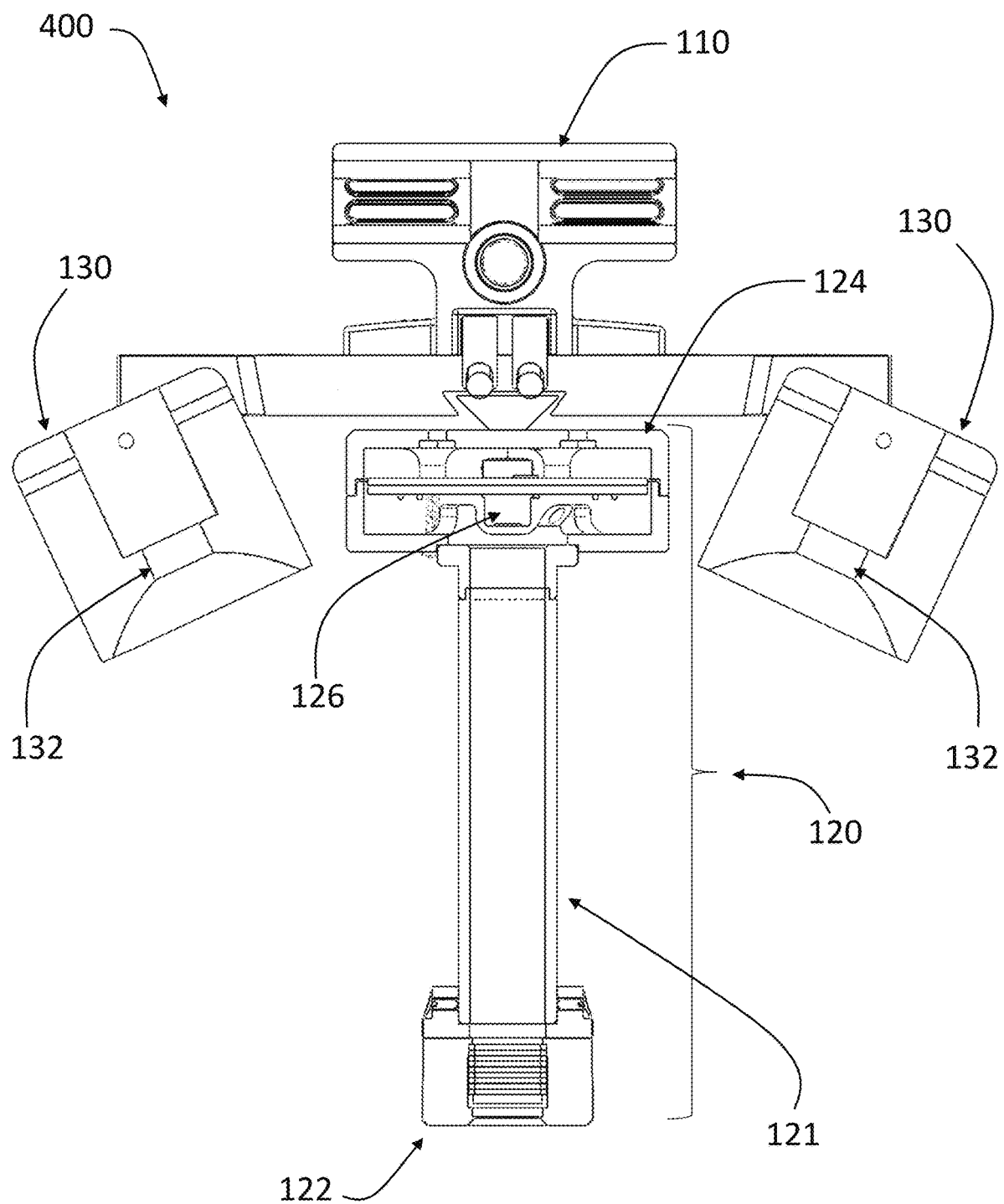
FIG. 4 illustrates a wiredrawing of a cross section of a portion of one embodiment of a sensing device in accordance with the present disclosure.

FIG. 4 illustrates a wiredrawing of a cross section 400 of the portion of the embodiment of the sensing device 100 in FIG. 3. The sensor 124 includes a photosensitive detector 126 (e.g., photodetector) positioned in the focal point of the sensor module 120. The photosensitive detector 126 may be selected to detect different wavelength ranges that correspond to the wavelength band of interest. The photosensitive detector 126 may be a multi-head detector or a single head detector. The photosensitive detector 126 may be, but is not limited to, silicon photodetectors, InGaAs photodetectors, multi-channel photodetectors including quad cells, cooled photodetectors with temperature sensors and thermo-electric cooling (TEC) devices, and thermopile infrared detectors.

The spectral bandpass filter 122 may be removably coupled to the lens tube 121. A robotic arm (not shown) may be used to automatically change between various band pass filters 122 that may be stored in the filter holder 125. Illumination sources 132 are shown positioned in the illumination modules 130. The illumination sources 132 may provide broadband illumination wavelengths such as quartz-tungsten halogen bulbs, or emission lamps such as fluorescents or mercury vapor lamps. The illumination sources 132 may also be selected to provide more narrow illumination, such as that provided light emitting diodes (LEDs) or surface emitting lasers.

The spectrally narrow bandpass filter or illumination source will typically cover 50% or less of a detector's photosensitive range. Often this is much finer, and some filters or discrete spectral sources will have a spectral Full Width at Half Maximum (FWHMs) as fine as 1 nm. Non-narrow bandpass filters can be much higher in bandwidths, and in the longer infrared wavelengths a bandpass could be as wide as 2500 nm depending on the application and measurement requirements. In embodiments, a FWHM value for a spectral bandpass filter may be 1 nm≤FWHM≤2500 nm, or may be 10 nm≤FWHM≤2000 nm, or may be 100 nm≤FWHM≤1000 nm, or may be 150 nm≤FWHM≤1500 nm, or may be 200 nm≤FWHM≤1000 nm, or may be 400 nm≤FWHM≤600 nm, or may be 10 nm≤FWHM≤70 nm, or may be 20 nm≤FWHM≤60 nm, or may be 1 nm≤FWHM≤10 nm. The FWHW of the spectral bandpass filters may be 50 nm.

The Center Wavelength (CWL) of the spectral bandpass filter may be between 150 nm and 3000 nm (e.g., 30 microns).

The sensor scans the object pixel by pixel by being moved in a raster pattern in the x-y plane, and the sensor (e.g., photosensitive detector) is focused by being automatically moved in the z-direction to a focus height.

Figure 5:
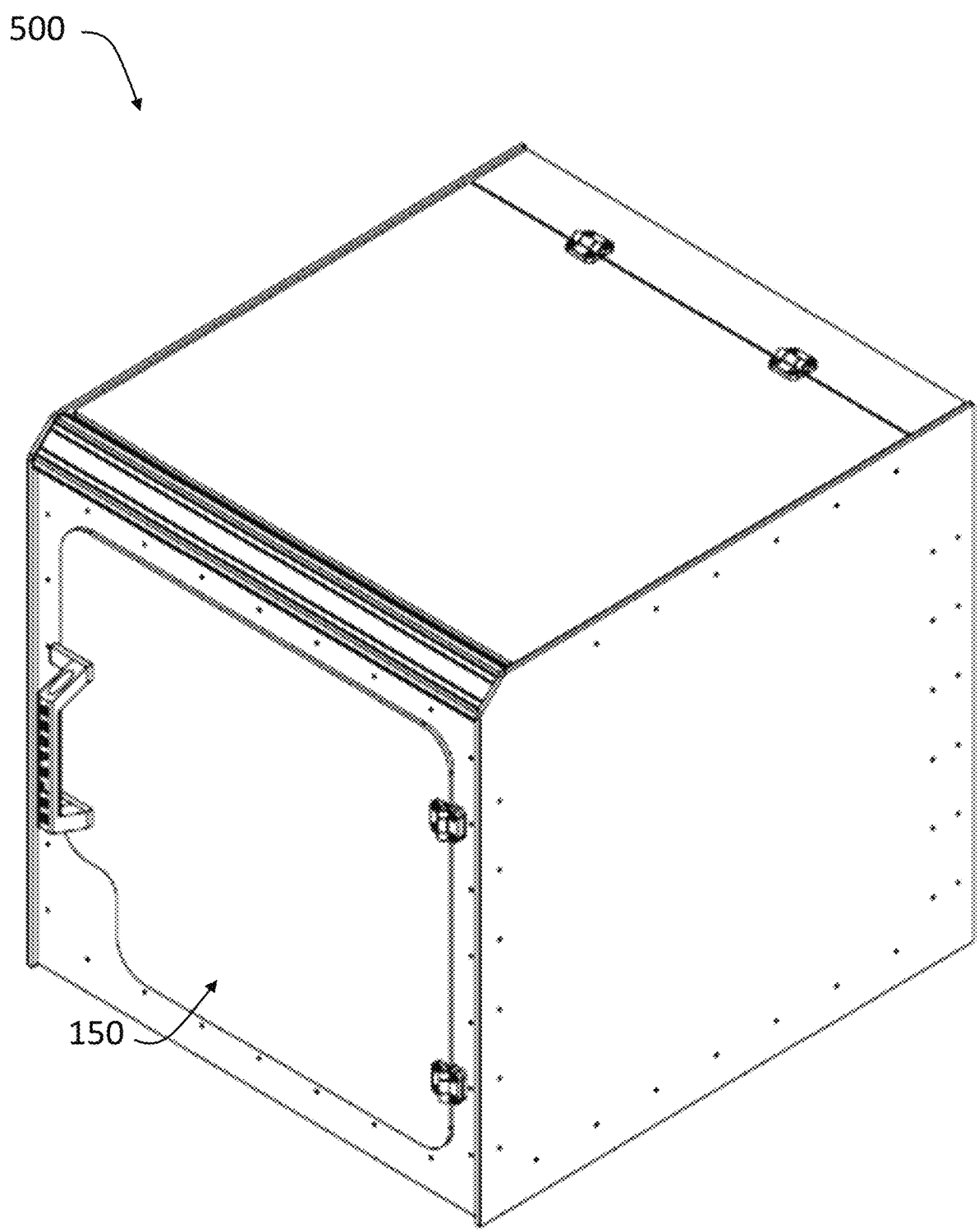
FIG. 5 illustrates a wiredrawing of an enclosure of one embodiment of a sensing device in accordance with the present disclosure.

FIG. 5 is a illustrates a wiredrawing 500 of an enclosure 150 of one embodiment of a sensing device 100 in accordance with the present disclosure. The enclosure 150 may be fabricated from a metallic, a plastic, other polymeric material. The shape of the enclosure 150 may be roughly cuboid, curvilinear, rectilinear, or the like.

Figure 6:
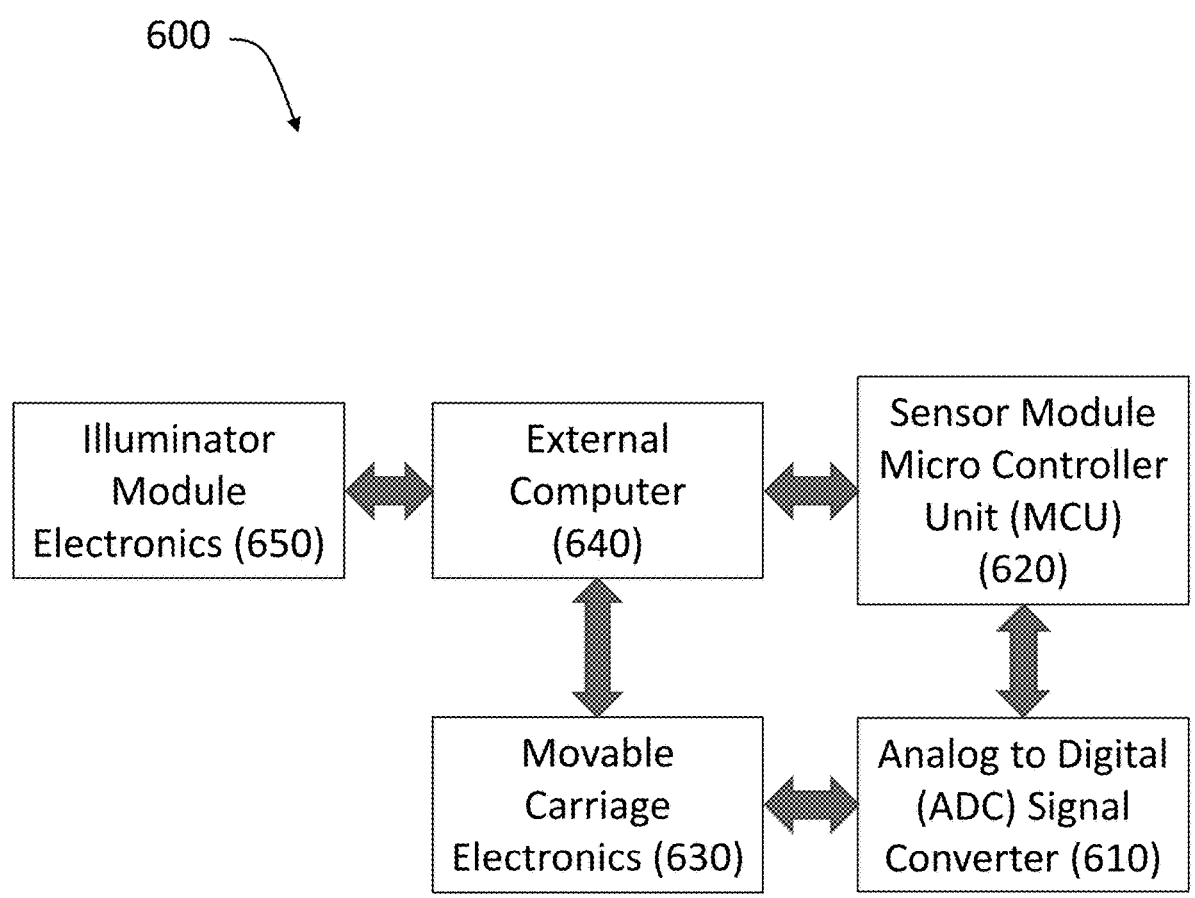
FIG. 6 shows a schematic diagram illustrating one embodiment of an electrical communications block diagram in accordance with the present disclosure.

FIG. 6 shows a schematic diagram illustrating an electrical communications block diagram 600. An analog to digital (ADC) signal converter 610 is in electrical connection with movable carriage electronics 630 and a sensor module micro controller unit (MCU) 620. The MCU 620 is in electrical connection with an external computer 640. The external computer 640 is also in electrical connection with the movable carriage electronics 630, and the illuminator module electronics 650. The external computer 640 may be programmable to provide controls to the sensor module MCO 620, the movable carriage electronics 630, and the illuminator module electronics 650. In embodiments the external computer 640 may be a controller of the sensing device 100.

Figure 7:
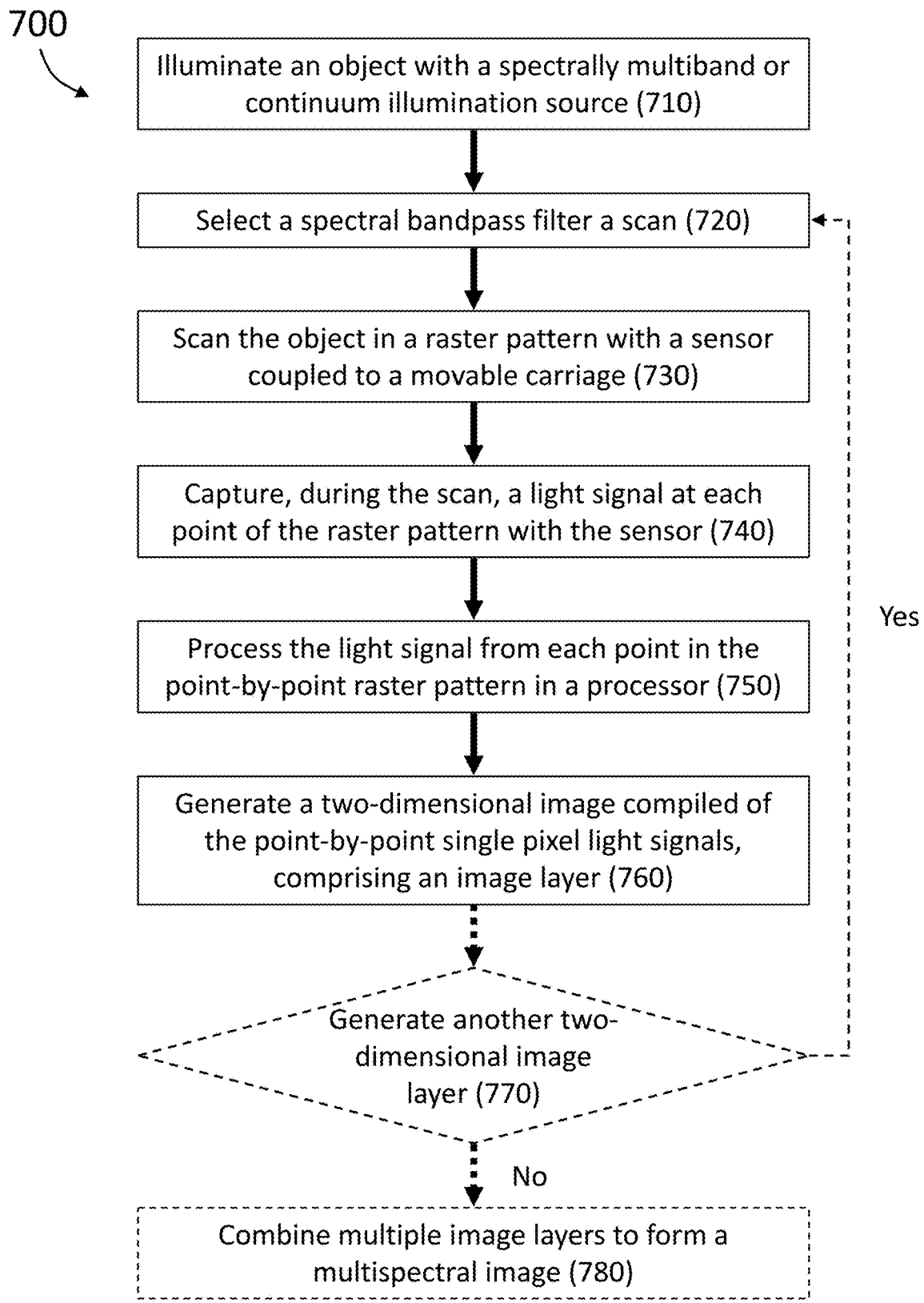
FIG. 7 shows an embodiment of a method of collecting a multispectral image of an object in accordance with the present disclosure.

FIG. 7 shows an embodiment 700 of a method of collecting a multispectral image of an object in accordance with the present disclosure. At step 710, an object is illuminated with a spectrally multiband or continuum illumination source 132. The object is positioned on a base 114 of the sensing device 110. The object may be coupled to the base 114, or may be simply placed on the base 114 or on the sample stage 115.

At step 720, a spectral bandpass filter 122 is selected for the scan. The spectral bandpass filter 122 may be selected from a collection of bandpass filters. The filters may have a bandpass width of a predetermined width as described above The spectral bandpass filters 122 may be automatically exchanged by a robotic arm (not shown). The collection of spectral bandpass filters may be stored in the filter holder 125, and the system may exchange the spectral bandpass 122 filter mounted onto the lens tube 121 for anyone of various bandpass filters stored on the filter holder 125. In the present embodiment, filters are magnetically retained to the lens tube during a scan. Filters are mechanically removed and installed by leveraging the movable carriage motion. When a scan with one spectral filter has been completed, the exchange process begins by moving the carriage to the position above the filter slot where the current filter is to be stored. The carriage then lowers z vertically until the filter is mated in the holder, and scrapes in an x-y motion to decouple the present filter and return it to the filter holder. Next, to pick up a new spectral filter the movable carriage must move above the next filter slot position and drop vertically until a magnetic mating has been achieved. Then, the filter is attached to the sensor and ready to scan.

At step 730, the object is scanned in a raster pattern with the sensor 124 which is coupled to the movable carriage 110. The sensor 124 is comprised of a lens and a single-pixel photosensitive detector 126. The movable carriage 110 is configured to be movable along the x-axis, y-axis, and z-axis. The z-axis is generally orthogonal to the base 114. The movable carriage 110 is configured to move in a point-by-point raster pattern in an x-y plane defined by the x-axis and the y-axis. This movement may be continuous without stopping or stopping slowly for each point. In the case of point-by-point scanning, carriage stepping can be configured as fine as motor limits will allow. This leads to a minimum step size of 10 um (e.g., 10 microns) in the some embodiments, and a maximum step size of 300 mm. The overall performance is a combination of carriage step size and optical resolution, as given by a specific lens configuration.

At step 740, a light signal is captured at each point of the raster pattern with the sensor 124 during the scan. The light signal from each point includes one or more of a light reflected off of the object or a light signal emitted from the object. The light signal from each point passes through a spectral bandpass filter 122 in the detector 126 optical path. The intensity of the reflectance captured for each pixel in the two-dimensional scan is stored in the external computer 640. The bandpass filter 122 is removably coupled to the sensor 124.

At step 750, the light signal is processed from each point in the point-by-point raster pattern in a controller. The signal processing can include performing data fusion and analytics on the data sets collected from the two-dimensional point-by-point scan. Signal processing may be performed in the sensor module MCU 620 or on the external computer 640.

At step 760, a two-dimensional image is generated from an image complied of the point-by-point single pixel light signals. The two-dimensional image comprises an image layer in a wavelength band of the spectral bandpass filter. The illuminating, scanning, capturing, processing, and generating are controlled by a controller.

At optional step 770, a decision is made whether to generate another two-dimensional image. When the decision to generate another two-dimensional image is yes (e.g., affirmative), the method returns to step 720 and another spectral bandpass filter 122 is selected and is exchanged for the bandpass filter 122 that was used for the previous scan. The exchange of spectral bandpass filters 122 may be performed manually by a user, or it may be performed automatically. When it is performed automatically, the exchange may be effected by a robotic arm.

In optional step 770, when the decision to generate another two-dimensional image is no (e.g., negative), the method proceeds to optional step 780.

In optional step 780, multiple image layers are combined to form a multispectral image. The multispectral image is generated by layering at least two, two-dimensional spectral images. Each two-dimensional image is a spectral image layer, and the combination of two, two-dimensional spectral images are used to build up a multi-spectral image.

EXAMPLES

Example. 1. Scanning Through a Silicon (Si) Wafer

The capacity of the sensing device 100 to scan objects and detect items that are not visible to the human eye is illustrated in FIGS. 8A, 8B, and 8C.

FIG. 8A shows a photograph of an embodiment of the sensing device 100. The movable carriage 110 is shown with a sensor module 120 positioned over the base 114. The sensor module 120 is configured to be movable in the z-direction, as well as the x-y directions. A silicon wafer 810 is positioned on the base. A rectangular box 817 is illustrated as being positioned over the silicon wafer. The rectangular box 817 shows a scan boundary 817 that is defined by the preprogrammed dimensions of the raster pattern that is to be used in the spatial scan.

FIG. 8B shows the silicon wafer 810 is positioned on the base. The rectangular scan boundary 817 is illustrated as being positioned over the silicon wafer.

FIG. 8C illustrates successive steps in creating a single layer spatial scan made up of a two-dimensional image compiled of point-by-point light signals captured in an infrared (e.g., IR) frequency band. The scan is carried out with a broadband light source and scanned with an InGaAs photodetector 126 (e.g., photosensitive detector). The photodetector is uncooled and operates in the short wavelength infra-red (SWIR) region of 800 nm to 1700 nm (e.g., 1.7 microns). While the photodetector is not cooled for these scans, in embodiments, the photodetector 126 may be cooled with, for example, thermos-electric cooling device (e.g., TEC). No filter was used in the scan.

The beginning of the spatial scan is a time=0, illustrated as t0 in FIG. 8B. At this point, the scan has not started, and the reflective silicon surface 817 completely covers the wafer. (The structure apparent in the reflection of the silicon wafer corresponds to some cabling and other parts of the sensing device.) The photographs in FIG. 8A and FIG. 8B are taken with an optical photographic device (e.g., camera).

At t1, about one third of the raster scan has been completed, as shown by the portion of the image identified as 820, while the unscanned portion of the silicon wafer 817 is shown. The scanned portion 820 is an overlay of the two-dimensional image captured by the SWIR photodetector overlayed over the optical image of the wafer 817. The scanned portion 820 has replaced the reflective silicon surface with a surface that appears to have a dull finish. The scanned portion 820 is actually showing the surface of the base 114 of the sensing device 100, since the silicon wafer is essentially transparent in SWIR region of 800 nm to 1700 nm.

At t2, about two thirds of the scan has been completed, and the overlay portion 820 reveals that letters have been written on the base beneath the silicon wafer. The letters "GPS" are visible in the spectral image 820 captured at t2. The letters "GPS" written on the base 114 are detected by the sensing device 100 in the SWIR wavelength range. The unscanned portion of the wafer 810 is visible in portion 817.

At t3, the scan has been completed. The outline of the circular shape of the silicon wafer is apparent, as are the letters "GPS" in the overlaid spectral image 817. There is a shadow apparent in t1-t3 that corresponds to shading caused by the silicon wafer since there is a single light source located at the top of the sensing device 100.

The scan of the silicon wafer illustrates that "defects" present in a silicon wafer may be detected by scanning the wafer with wavelengths that pass through the silicon wafer and can reveal the presence of substances that would otherwise be impossible to see with the human eye.

Example 2. Detecting Mislabeled Fabric

Recycling fabric requires knowing the compositions of the materials making up the fabric. Fabrics may contain cotton, polyester, or some other material. The ability to perform automated recycling is benefited by sorting fabrics on a conveyor belt. One embodiment of the sensing device has been used to detect a mislabeled fabric.

Figure 9:
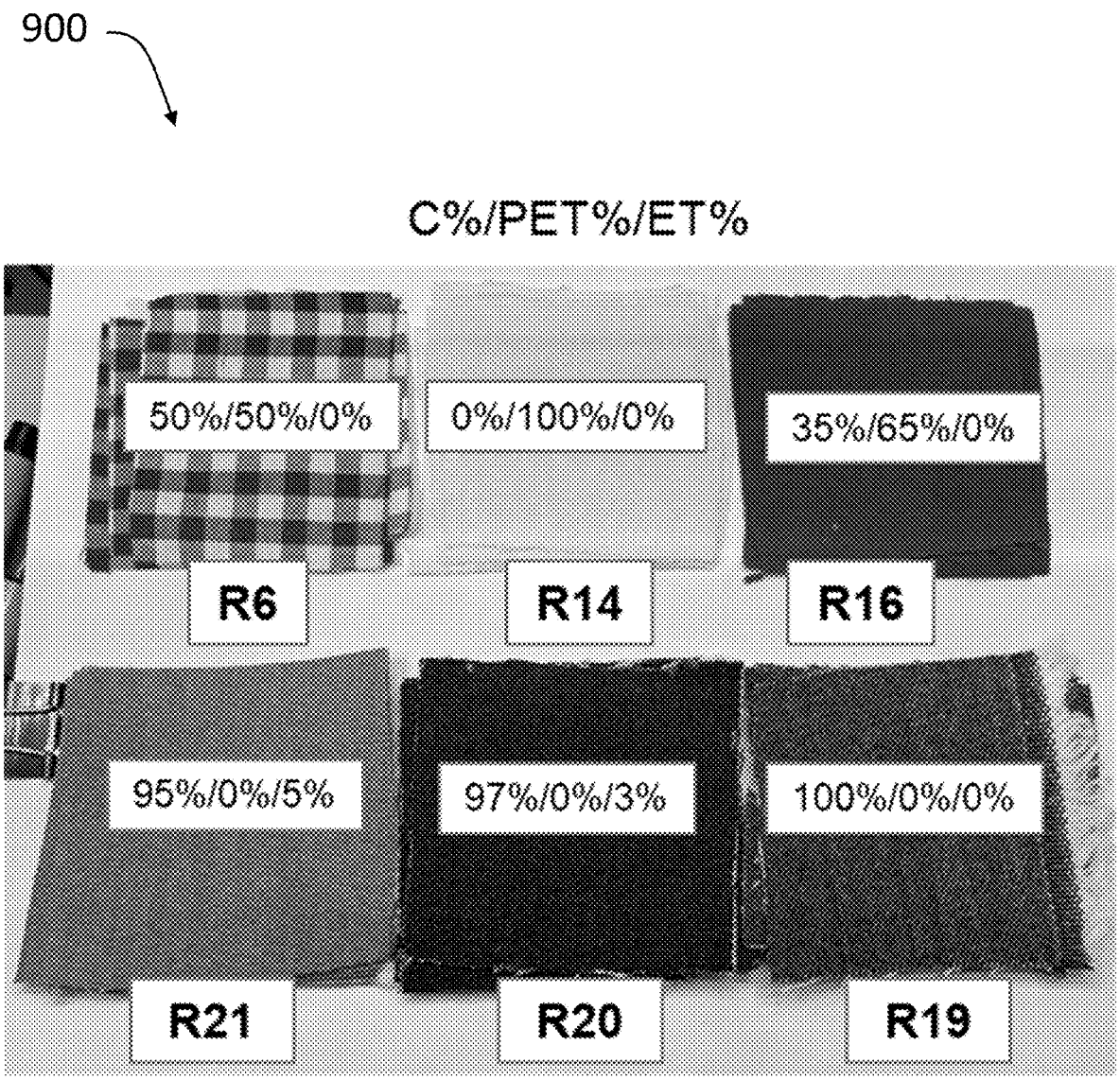
FIG. 9 shows a photograph of six sample fabrics.

FIG. 9 shows photographs of six sample fabrics labeled R6, R14, R16, R21, R20, and R19. Each sample fabric in FIG. 9 has been labeled with estimated amounts of percentages of cotton (C %), polyester (PET %), and elastane (ET %) as reported by the manufacturer.

Figure 10A:
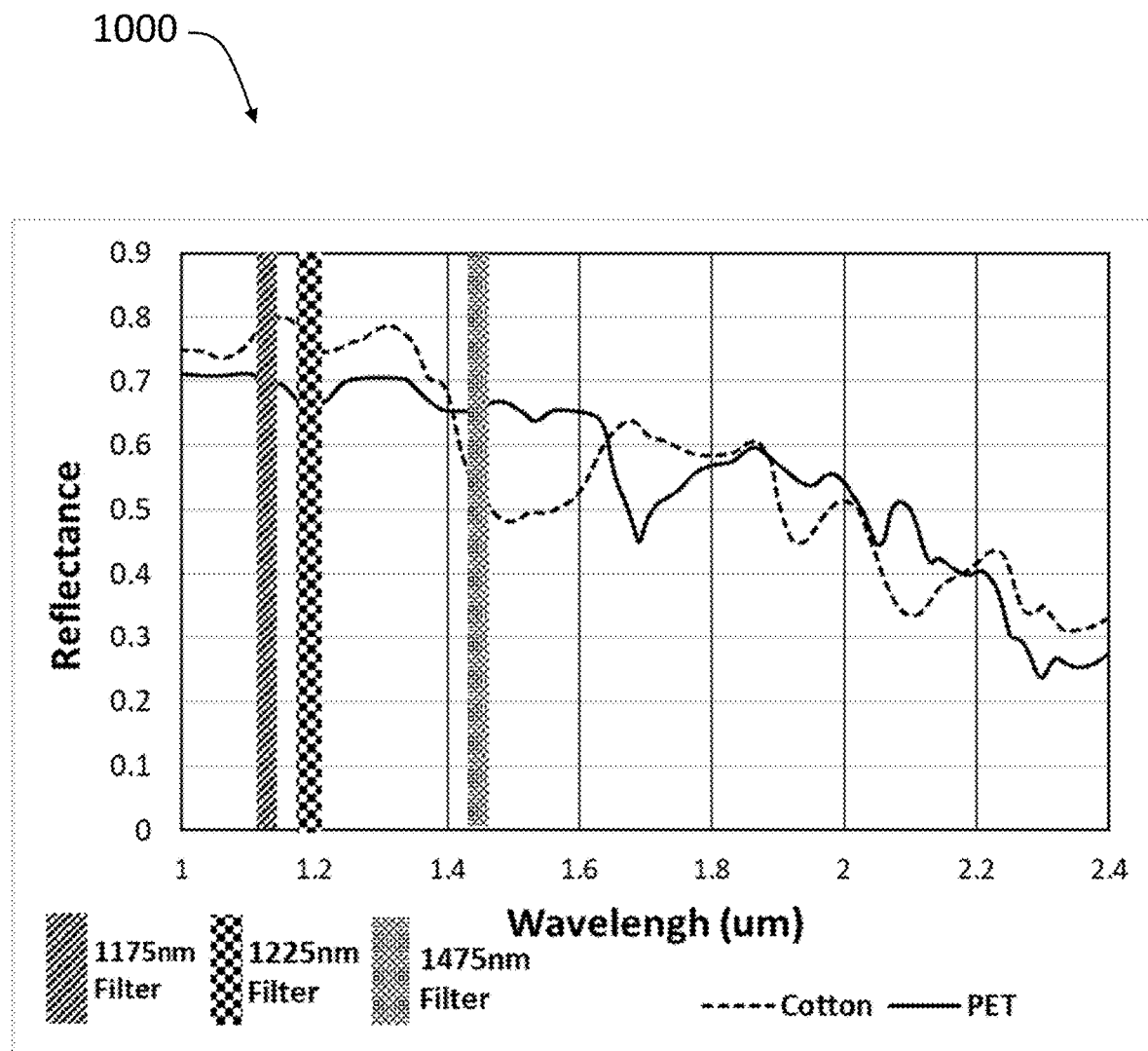
FIG. 10A shows Reflectance versus Wavelength (microns) for cotton and polyester (e.g., PET).

FIG. 10A shows a plot 1000 of reference Reflectance Intensity versus Wavelength (microns) for cotton (dashed line) and PET (solid line). FIG. 10A also shows lines corresponding to wavelengths of 1175 nm, 1225 nm, and 1425 nm. Using the ratios of Reflectance Intensities of cotton and PET at each of the measurement wavelengths of 1175 nm, 1225 nm, and 1425 nm the expected signal strengths for each material are determined at each measurement wavelength.

Figure 10B:
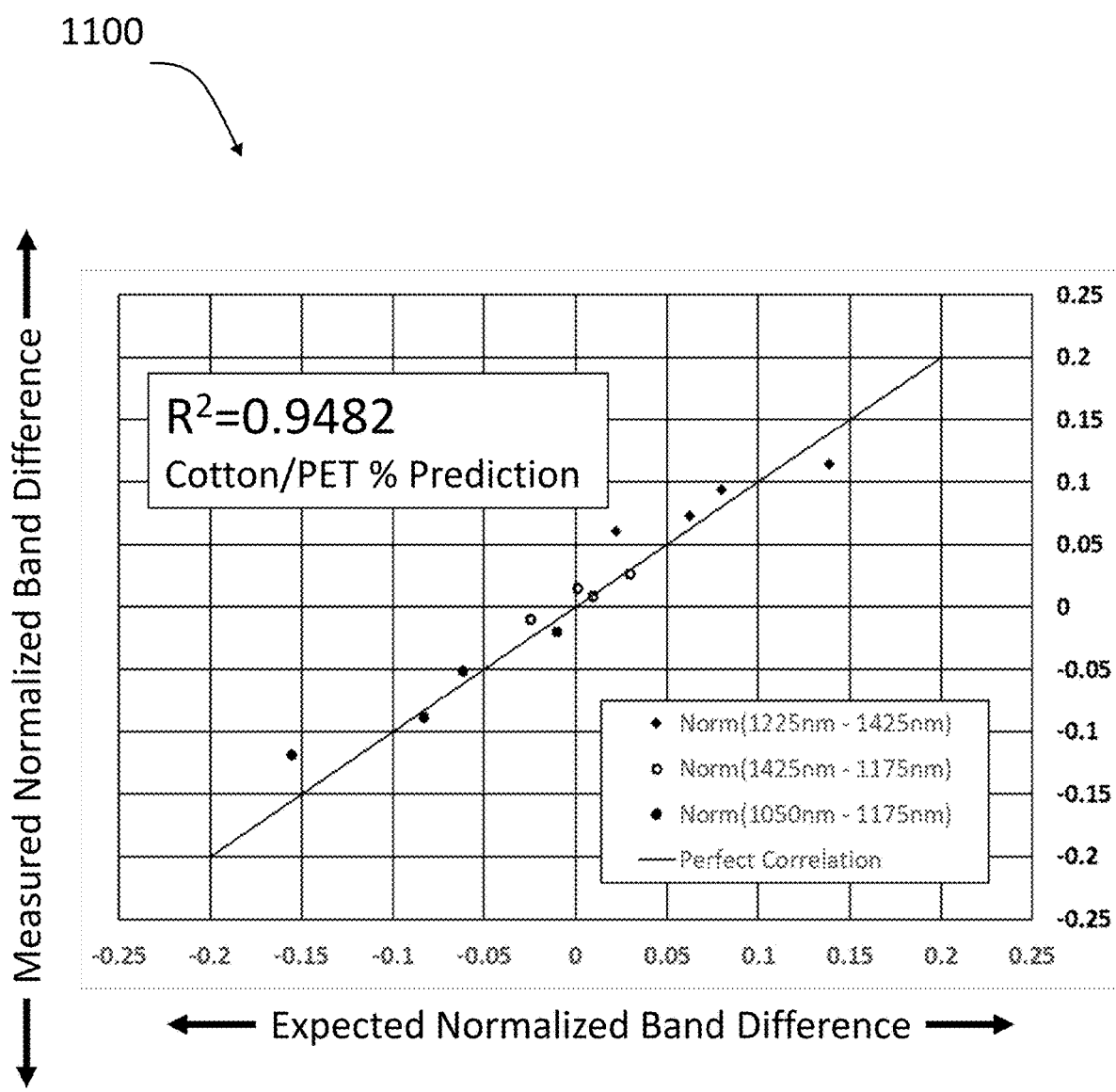
FIG. 10B shows a plot of Measured signals for fabrics with different ratios of cotton to PET versus Expected signals for the same ratios.

10) FIG. 10B shows a plot 1000 of Measured signals for fabrics with different ratios of cotton to PET (e.g., Cotton/PET %) versus Expected (e.g., modeled) signals for the same ratios. The $R^2$ value for the plot shows a very high degree correlation, indicating that ratios of cotton to PET measured for unknown fabrics can be used to determine actual ratios of fabrics with a high degree of confidence. It is noted that the accurate determination of the ratios of cotton to polyester 15 (e.g., Cotton/PET) do not appear to be affected by the presence of elastane (ET).

Figure 11A:
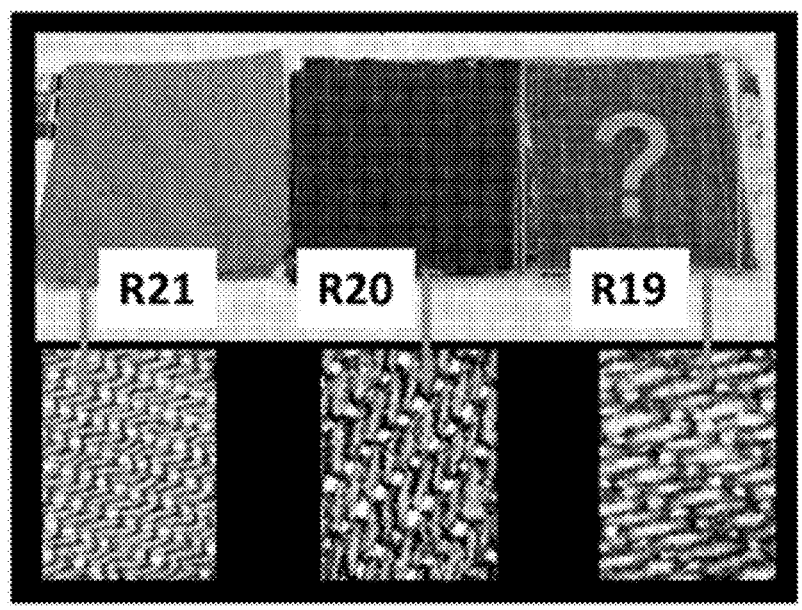
FIG. 11A shows photographs of fabric samples R21, R20, and R19 (top row) together with the digital microscope images of the same samples (bottom row).

The top row of FIG. 11A shows photographs of fabric samples R21, R20, and R19 (top row) that are discussed above in FIG. 9. The bottom row of FIG. 11A shows magnified digital camera microscope 140 images of the fabric samples R21, R20, and R19. The magnification in these images is approximately 60×.

Figure 11B:
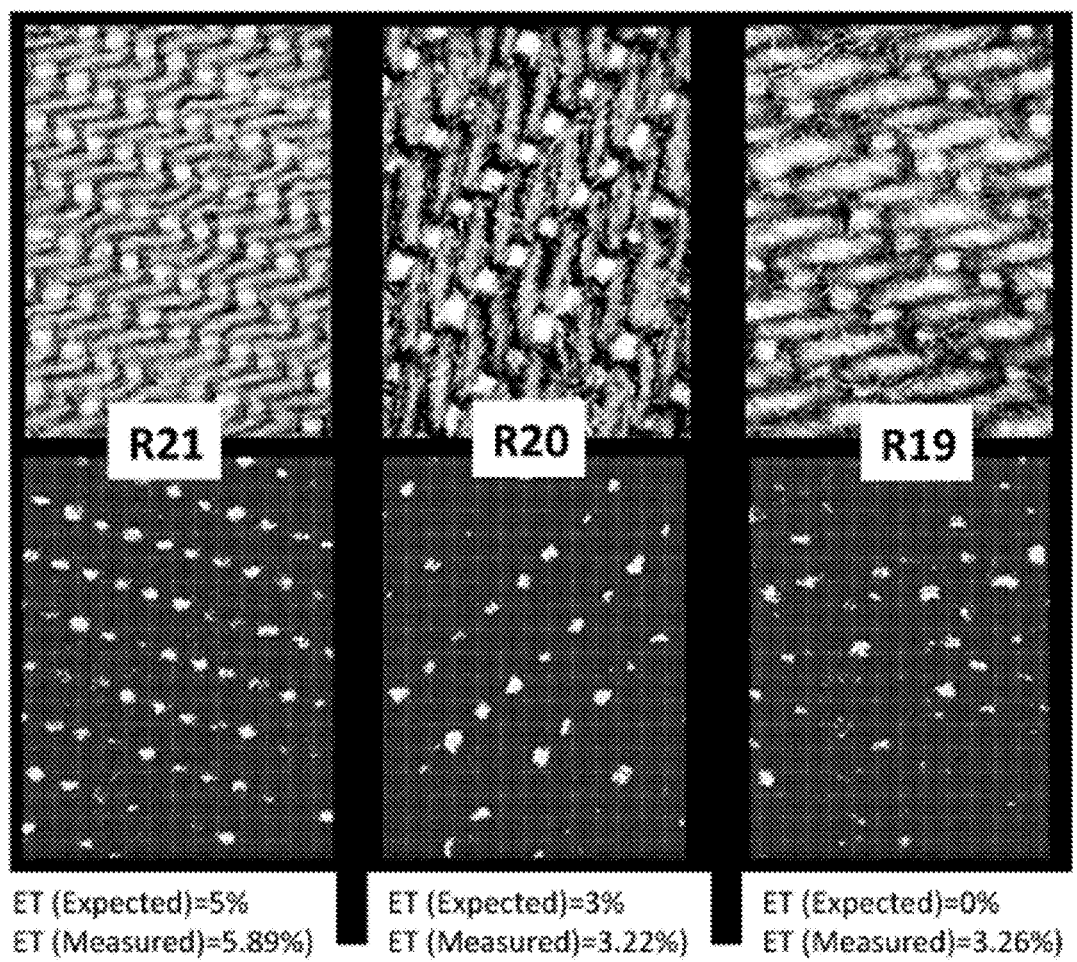
FIG. 11B shows the digital microscope images of fabric samples R21, R20, and R19 (top row), as shown in FIG. 11A, together with image-processed images of the same fabric samples (bottom row).

The top row of FIG. 11B shows identical microscopic images of fabric samples R21, R20, and R19, as shown in the bottom row of FIG. 11A. The bottom row of FIG. 11B shows fabric samples R21, R20, and R19 after going through image processing to highlight the elastane present in the fabrics.

The image-processed images of R21 and R20 (bottom row) were analyzed to determine the amount of elastane present in the samples. The bottom row of FIG. 11B include expected and measured vales of elastane in the fabric samples. FIG. 11B shows that the measured amount of elastane (ET) corresponds very closely (within less than 1%) to the expected amount for samples R21 and R20. For R21, the expected value of elastane was 5%, and the measured value was 5.89%. For R20, the expected value of elastane was 3%, and the measured value was 3.22%. However, sample R19, which was not believed to have any elastane, actually had 3.26% of elastane (ET) present in the R19 fabric.

In this example, image processing of fabric samples was successfully used to identify a component (elastane) in a fabric sample that was not believed to contain elastane.

Example 3. Multispectral Images of Fabric Sample

Recycling fabric requires knowing the compositions of the materials making up the fabric. Fabrics may contain cotton, polyester, or some other material. The ability to perform automated recycling is benefited by sorting fabrics on a conveyor belt.

Figure 12A:
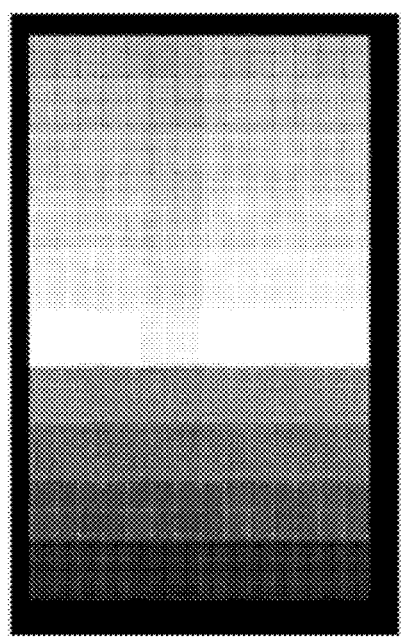
FIG. 12A shows a theoretical color pallet depending on the ratio and the reflectance dictated by the dye/color of the sample.

FIG. 12A shows a theoretical color pallet depending on the ratio and the reflectance dictated by the dye/color of the sample.

Figure 12B:
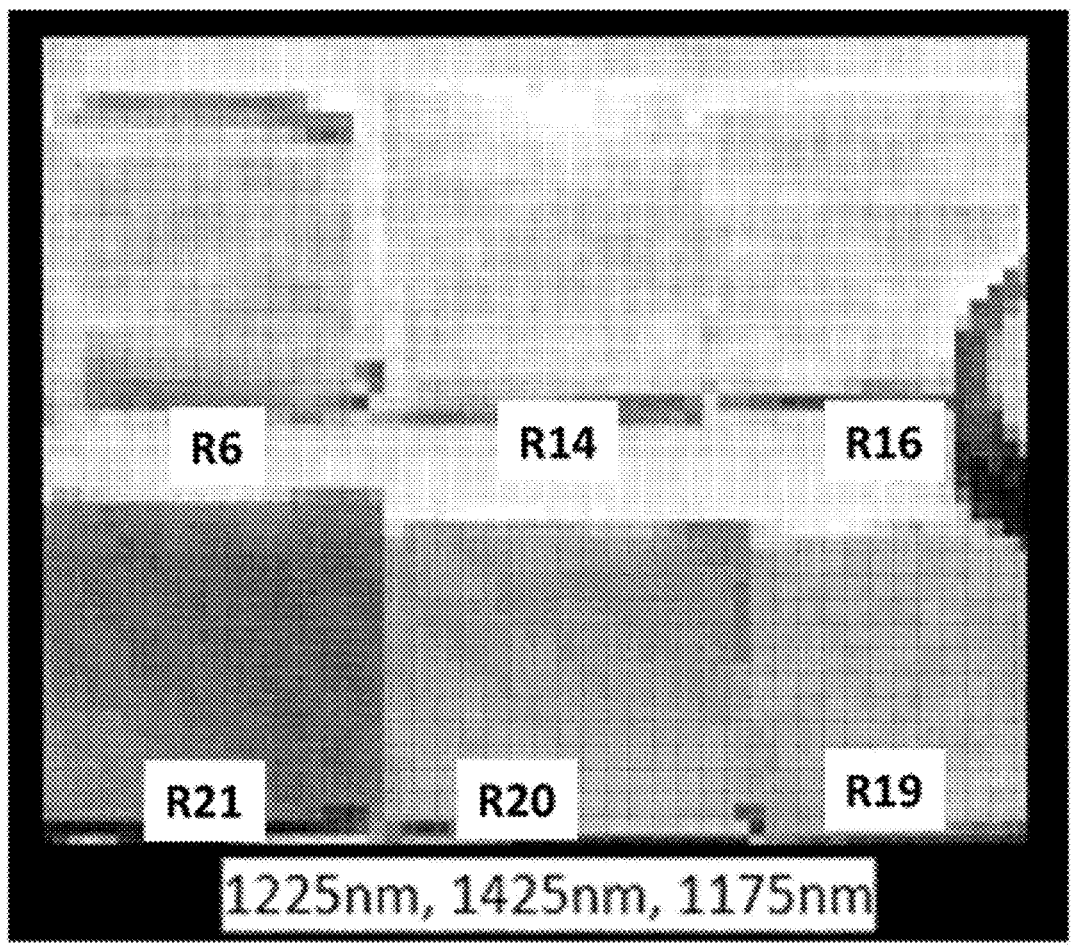
FIG. 12B shows multispectral images of R6, R14, R16, R21, R20, and R19 measured at 1175 nm, 1225 nm, and 1425 nm.

FIG. 12B shows multispectral images of the six fabric samples of FIG. 9. The multispectral image scanning was performed in non-visible wavelength bands in the short wavelength infra-red (SWIR). A point-by-point scan was performed for each fabric sample in a raster pattern covering a predetermined rectangular scan boundary, and an intensity value of the reflected radiation for each point in the scan was stored in an external computer.

The full width of the photodetector sensitivity spanned from 1 micron to 1.7 microns (e.g., 1000 nm to 1700 nm). Three spectral bandpass filters were selected to cover non-overlapping wavelength band regions. The three wavelength bands included a first band of 1175 nm, Center Wavelength (CWL) with 50 nm Full-Width at Half Maximum (FWHM), a second band with 1225 nm CWL and 50 nm FWHM, and a third band with 1425 nm CWL and 50 nm FWHM. The relative position of these wavelength bands in the spanned spectrum is shown in FIG. 10A.

The photosensitive detector measured the intensity of the light (e.g., radiation) reflected off of each of the fabric samples for each point in the scan. Broadband radiation was reflected from the fabrics which attenuate the photonic signal. Then the attenuated photonic signal is passed through one of the spectral bandpass filters described above before arriving at the photosensitive detector. The photosensitive detector converts the incident photonic signal into an electrical signal, which is then digitized into a 16-bit number. That is, broadband radiation was reflected off of the samples and passed through a bandpass filter so that a very narrow band of radiation was received by the photosensitive detector. Each point measurement can then be assembled into an image for each bandpass filter, where digital intensity in each pixel is proportional to the measured light within the spectral band.

For the purposes of visualizing infrared spectral images, the two-dimensional images scanned with different spectral bandpass filters can be assigned a color. In this way the differences in reflectance intensity for each point (e.g., single pixel) in the different samples can be observed in a visible color representation. Therefore, each wavelength band isolated by the spectral bandpass filters was assigned one of either red, blue, or green. The color assignment of the three wavelength bands included a first band of with 1175 nm CWL with 50 nm FWHM (blue), a second band with 1225 nm CWL and 50 nm FWHM (red), and a third band with 1425 nm CWL and 50 nm FWHM (green).

The two-dimensional spectral images compiled in the scans of each of the fabric samples for each of the spectral bandpass filters were processed to correct for reflectance measurements and the "white" and "dark" for each scan was set by calibration.

FIG. 12B shows the final multispectral images of the six fabric samples of FIG. 9.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, solid state drive, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Various aspects and embodiments of the invention described above are intended to be merely exemplary; numerous variations and modifications will be apparent to those skilled in the art. Such variations and modifications are intended to be within the scope of the present invention as defined by any of the appended claims.

Embodiments of this disclosure and accompanying drawings have been discussed in reference to the numerals provided therein so as to enable one skilled in the art to practice the present disclosure. The drawings and the descriptions thereof are intended to be exemplary of various aspects of examples of the invention and are not intended to narrow the scope of the appended claims. Furthermore, it will be appreciated that the drawings may show aspects of the invention in isolation and the elements in one figure may be used in conjunction with elements shown in other figures, etc.

What is claimed is:

1. A multispectral imaging device having an x-axis, y-axis, and z-axis for imaging an object, the multispectral imaging device comprising:
a base;
a movable carriage configured to be movable along the x-axis, y-axis, and z-axis, the z-axis being generally orthogonal to the base;
a single-pixel, photosensitive detector coupled with the movable carriage;
a sensor comprised of a lens and the photosensitive detector, the sensor coupled with the movable carriage, the sensor configured to capture light in a visible, or a non-visible light frequency band at a single point on or within a sample when the base supports the sample;
a spectrally multiband or continuum illumination source;
a controller configured to automatically exchange spectral bandpass filters from the detector optical path, to allow for spatial scans to be performed for more than one spectral band, the movable carriage, the base, or both the movable carriage and base being automatically movable along the z-axis to produce a sensor focus adjustment relative to the object.

2. The device of claim 1, wherein:
a spatial scan comprises a two-dimensional image compiled of point-by-point light signals captured in the visible or the non-visible light frequency bands.

3. The device of claim 1 further comprising:
a processor coupled to the sensor, the movable carriage, the base, and the controller, wherein the processor performs data fusion and analytics during spatial scans.

4. The device of claim 3, wherein the device is configured to:
take a first two-dimensional image at a first frequency band using a first filter to produce first results;
take a second two-dimensional image at a second frequency band using a second filter to produce second results;
perform data fusion and analytics on the first and second results.

5. The device of claim 4, wherein the device is further configured to:
capture imagery with a focus topology adjustment.

6. The device of claim 1, wherein the spectrally multiband or continuum illumination source comprises a source of infrared, visible, and/or ultraviolet radiation in the wavelength range of between 150 nm and 30 microns.

7. The device of claim 6, wherein the source of infrared comprises the short wave infrared region of 800 nm to 1700 nm.

8. The device of claim 6, wherein the source of visible and/or ultraviolet comprises light emitting diodes (LEDs).

9. The device of claim 1, wherein the spectrally multiband or continuum illumination source comprises at least one of light from fluorescence or light from thermal infrared radiation.

10. The device of claim 1, wherein the spectrally multiband or continuum illumination source comprises a quartz tungsten halogen (QTH) lamp.

11. The device of claim 1, wherein the spectral bandpass filters cover different wavelength bands ranges of wavelengths between 150 nm and 30 microns.

12. The device of claim 11, wherein the spectral bandpass filters have:
 a center wavelength that is between 1000 nm and 1700 nm; and
 a full width half maximum that is between 25 nm and 75 nm.

13. A method of collecting a spectral image of an object, the method comprising:
 illuminating an object with a spectrally multiband or continuum illumination source, the object coupled to a base;
 scanning the object with a sensor coupled to a movable carriage; the sensor comprised of a lens and a single-pixel photosensitive detector; the movable carriage configured to be movable along the x-axis, y-axis, and z-axis, the z-axis being generally orthogonal to the base; the movable carriage being moved in a point-by-point raster pattern in an x-y plane defined by the x-axis and the y-axis;
 capturing, during the scanning, a light signal from each point in the point-by-point raster pattern, the light signal from each point comprising one or more of a light reflected off of the object or a light signal emitted from the object, the light signal from each point passing through a spectral bandpass filter in the detector optical path, the bandpass filter being removably coupled to the sensor;
 processing the light signal from each point in the point-by-point raster pattern in a processor;
 generating a two-dimensional image compiled of the point-by-point single pixel light signals, wherein the two dimensional image comprises an image layer in a wavelength band of the spectral bandpass filter,
 wherein the illuminating, scanning, capturing, processing, and generating are controlled by a controller.

14. The method of claim 13, wherein:
 the scanning the object is a first scanning;
 the capturing a light signal is a first capturing through a first spectral bandpass filter;
 the processing is a first processing; and
 the generating is a first generating;
 the image layer is a first image layer; and
 the method further comprising:
  scanning the object a second time with the sensor coupled to a movable carriage; the sensor comprised of a lens and a single-pixel photosensitive detector; the movable carriage configured to be movable along the x-axis, y-axis, and z-axis, the z-axis being generally orthogonal to the base; the movable carriage being moved in a point-by-point raster pattern in an x-y plane defined by the x-axis and the y-axis;
  capturing, during the second scanning, a second light signal from each point in the point-by-point raster pattern, the second light signal from each point comprising one or more of a second light reflected off of the object or a second light signal emitted from the object, the second light signal from each point passing through a second spectral bandpass filter in the detector optical path, the second bandpass filter having a different wavelength band than the first bandpass filter;
  processing the second light signal from each point in the point-by-point raster pattern from the second scanning in a processor;
  generating a second two-dimensional image compiled of the second point-by-point single pixel light signals, wherein the second two dimensional image comprises a second image layer in a second wavelength band of the second spectral bandpass filter;
  combining the second image layer with the first image layer to form a multispectral image of the object.

15. The method of claim 13, wherein the movable carriage comprises a gantry.

16. The method of claim 14 further comprising:
 exchanging the first bandpass filter with the second bandpass filter.

17. The method of claim 15, wherein the exchanging is performed automatically with the moveable carriage, the automatic exchanging is controlled by the controller.

18. A multispectral imaging system for imaging an object, the multispectral imaging system comprising:
 a base;
 a movable carriage configured to be movable along an x-axis, a y-axis, and a z-axis, the z-axis being generally orthogonal to the base;
 a sensor module comprising a lens and a single-pixel photosensitive detector, the sensor module coupled with the moveable carriage, the sensor module configured to capture a light signal in one or both of a visible light frequency band or a non-visible light frequency band;
 an illumination module, the illumination module comprising one or more illumination sources;
 an microscope module, the microscope module comprising a lens and a digital camera;
 a controller configured to:
 to allow for spatial scans to be performed for more than one spectral band, wherein,
 the movable carriage, the base, or both the movable carriage and base are automatically movable along the z-axis to produce a sensor focus adjustment relative to the object.

19. The system of claim 18, wherein the one or more illumination sources comprises one of more narrow band light sources.

20. The system of claim 19, wherein the one or more narrow light sources are automatically exchangeable.

21. The system of claim 19, wherein the one or more narrow band light sources comprise an LED or a laser.

22. The system of claim 21, wherein the LED or the laser have wavelength bands between 1 nm and 300 nm.

23. The system of claim 18, wherein the single-pixel photosensitive detector comprises a multi-head detector or a single-head detector.

* * * * *